Oct. 21, 1958 R. C. REED 2,857,518
TRANSISTOR BLOCKING OSCILLATOR
Filed Dec. 23, 1955

*INVENTOR.*
ROBERT C. REED
*BY* William R. Rane
ATTORNEY

United States Patent Office 2,857,518

Patented Oct. 21, 1958

2,857,518

TRANSISTOR BLOCKING OSCILLATOR

Robert C. Reed, Whittier, Calif., assignor to North American Aviation, Inc.

Application December 23, 1955, Serial No. 554,949

7 Claims. (Cl. 250—36)

This invention is an improved transistor blocking oscillator which provides an output pulse of radio frequency containing considerable power.

In the design of a triggered blocking oscillator, using transistors, various difficulties are encountered, such as maintaining the output pulse of constant width regardless of change in frequency of the input pulse. Another difficulty is the accumulation of high voltages within the transistor circuit when greater power requirements are to be met. The device of the invention has been found to maintain a given power output and pulse width output although the input driving frequency is varied to meet different needs. Some types of blocking oscillators produce a pulse having a sharp rise time, and a slow fall time. The fall time usually is a decay curve and consequently is not as sharp as may be desired. The pulse output of this invention is sharp both in fall and rise times. Further, increased frequency of operation can be obtained.

It is therefore an object of this invention to provide an improved transistor blocking oscillator.

It is another object of this invention to provide a blocking oscillator capable of high frequency operation.

Another object of this invention is to provide a transistor blocking oscillator having improved power and pulse width output characteristics.

It is another object of this invention to provide a transistor blocking oscillator maintaining pulse width output under conditions of varying frequency input.

Still another object of this invention is to provide a transistor blocking oscillator providing pulse output having improved rise and fall times.

Still another object of this invention is to provide a transistor blocking oscillator having increased power output.

Other objects of the invention will become apparent from the following description taken in connection with the accompanying drawings, in which.

Figure 1:
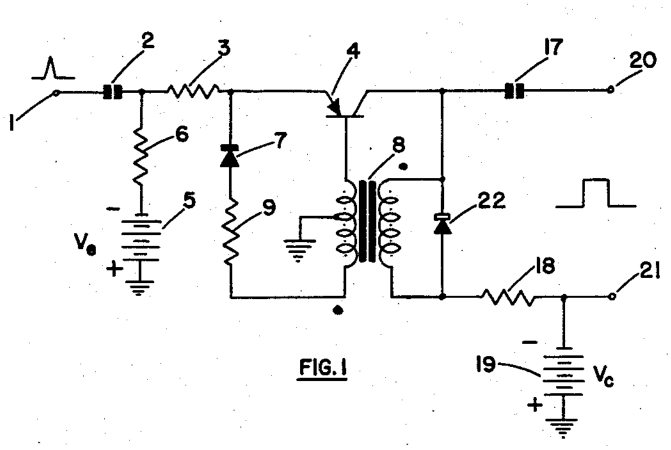
Fig. 1 is a schematic diagram of the device of the invention.

In Fig. 1, a synchronizing or output positive pulse of, for example, +3 volts is received at terminal 1 and is transmited through an input coupling circuit comprising capacitor 2 and resistor 3 to the emitter of transistor 4. The emitter of transistor 4 is placed at its operating point by voltage supply 5 and resistor 6, together with resistor 3. Diode 7 prevents the positive input pulse from being transmitted into the base circuit of the transistor. The collector of the transistor is connected to provide feedback through saturable pulse transformer 8 to both the base and the emitter of the transistor. The center tap of the secondary of pulse transformer 8 is grounded. One side of the secondary is connected through resistor 9 and diode 7 to the emitter of the transistor. The feedback from the collector of the transistor 4, both to the base and the emitter of the transistor, is in a polarity such as to reinforce the original conduction and, therefore, the transistor conducts heavily for a very short period of time.

Figure 2:
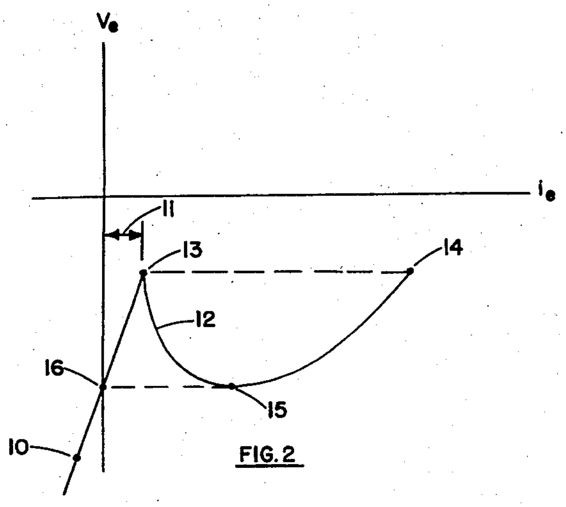
Fig. 2 is a graph showing emitter voltage and current relationship in a point contact type transistor.

Referring to Fig. 2, in the quiescent condition, the emitter of the point contact transistor is held at point 10 by voltage source 5 of Fig. 1. Capacitor 2 isolates this circuit from the previous circuit and the D.-C. current flowing therein. When a positive trigger signal is received at terminal 1, passing through capacitor 2, a current exceeding current 11 in Fig. 2 is caused to flow in transistor 4, and the transistor is caused to pass into the unstable, negative resistance region indicated by the downward sloping line 12. Because of the two positive feedback paths causing the collector current to increase very rapidly, the transistor current jumps from point 13 directly to point 14 along the dotted line. Resistor 3 aids in isolating the feedback current to the collector from flowing in the source 5, resistor 6 and capacitor 2. Because of the two regenerative feedback paths, to the emitter and to the base, the circuit is held in the saturation region from point 14 to point 15 until the low frequency cutoff of the pulse transformer is reached. The pulse transformer is a common type transformer having low leakage inductance and low stray capacitance. The rise and fall times of induced voltages are sharp.

The time constant of the feedback path from the collector of the transistor 4 to the emitter is critical, and it is controlled by the value of resistance 9. The variation of resistance 9 can be used to control the width of the output pulse of the circuit. At the low frequency cutoff of the pulse transformer, the feedback paths become essentially opened so that emitter current decreases along the line from point 14 to point 15 in Fig. 2. Upon reaching point 15 the transistor is again in an unstable negative resistance region and jumps to point 16 in the low stable state. The output of the device is obtained through an output coupling circuit comprising capacitor 17 connected to the collector of the transistor and resistor 18 connected to the pulse transformer 8. Voltage source 19 establishes the voltage level of the transistor collector. The output is received at terminals 20 and 21 and is a square wave substantially as is shown, having sharp rise and fall times. Diode 22 is provided across the input to pulse transformer 8 to clip any negative overshoots which may appear in the current flow in the collector circuit. If the emitter voltage supply 5 is, for example, —25 volts and the collector voltage supply, for example, is —25 volts, a pulse amplitude output of 20 volts leading into a 500-ohm resistance load can be developed. Rise times have been developed less than 0.04 microsecond, and a fall time has been developed less than 0.01 microsecond. The circuit can be operated from single shot triggering up to 180 kilocycles and even higher.

This blocking oscillator circuit provides maximum power content, together with a pulse width which remains within the given requirements regardless of variation in input frequency or triggering of the oscillator. Depending on the type of coupling desired between stages, capacitors 7 and 12 may be eliminated. Resistance 18 is desirable to limit the current flow in the collector circuit of the transistor.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a transistor blocking oscillator, a transistor having at least emitter, base, and collector electrodes, means for establishing voltage on said emitter electrode of said transistor, means for establishing voltage on said collector electrode of said transistor, regenerative feedback paths from said collector electrode to said emitter electrode and to said base electrode, said feedback paths comprising a pulse transformer having at least primary and secondary windings, said primary winding being connected to receive the output of said collector electrode, said secondary winding being connected in series circuit with said base and said emitter electrodes, and a undirectional current flow device connected between said emitter electrode and said secondary winding.

2. In a transistor blocking oscillator, a transistor having at least emitter, base, and collector electrodes, means for establishing voltage on said emitter electrode, means for establishing voltage on said collector electrode, regenerative feedback paths from said collector electrode to said emitter electrode and to said base electrode, said feedback paths comprising a pulse transformer having at least primary and secondary windings, said primary winding being connected to receive the output of said collector electrode, said secondary winding being connected in series circuit with said base and said emitter electrodes, a undirectional current flow device connected between said emitter electrode and said secondary winding, and a undirectional current flow device connected across said primary of said pulse transformer.

3. In a transistor blocking oscillator, a point contact transistor having at least emitter, base, and collector electrodes, a first voltage supply means connected to establish the voltage of said emitter electrode of said transistor with respect to ground, a second voltage supply means connected to establish the voltage of said collector electrode of said transistor with respect to ground, a pulse transformer having at least primary and secondary windings, said primary being connected to receive the output of said collector of said transistor and said secondary being connected in series circuit with said emitter and said base of said transistor, said secondary having a center tap which is connected to ground.

4. The combination recited in claim 3 wherein is included a diode connected in circuit intermediate said emitter electrode of said transistor and said secondary of said pulse transformer.

5. The combination recited in claim 3 wherein is included a first diode connected in circuit intermediate said emitter electrode of said transistor and said secondary of said pulse transformer, and a second diode connected across said primary of said pulse transformer.

6. In a transistor blocking oscillator, a point contact transistor having at least emitter, collector, and base electrodes, means for establishing voltage on said emitter electrode, means for establishing voltage on said collector electrode, a first regenerative feedback path from said collector electrode to said base electrode, and a second regenerative feedback path from said collector electrode to said emitter electrode, said second feedback path comprising an impedance and a diode.

7. A transistor blocking oscillator comprising a transistor having at least emitter, base and collector electrodes, input coupling means connected to said emitter electrode of said transistor, direct current supply means connected to establish the voltage level of said emitter electrode of said transistor, output coupling means connected to said collector electrode of said transistor, a pulse transformer having at least primary and secondary windings, said primary of said pulse transformer connected at one end to said collector electrode of said transistor, direct current supply means connected to the other end of said primary of said pulse transformer, a first diode connected across said primary of said pulse transformer, said secondary of said transformer being connected at one end to said base electrode of said transistor, a second diode, a resistor connected in series with said second diode, said emitter electrode of said transistor and the other end of said secondary of said transformer, said secondary of said transformer having a center tap which is connected to ground.

References Cited in the file of this patent

UNITED STATES PATENTS

| | | |
|---|---|---|
| 2,745,012 | Felker | May 8, 1956 |
| 2,758,206 | Hamilton | Aug. 7, 1956 |

Disclaimer 2,857,518.—*Robert C. Reed*, Whittier, Calif. TRANSISTOR BLOCKING OSCILLATOR. Patent dated Oct. 21, 1958. Disclaimer filed May 26, 1961, by the assignee, *North American Aviation, Inc.*

Hereby enters this disclaimer to claims 1 and 6 of said patent.

[*Official Gazette July 11, 1961.*]